Oct. 14, 1969    R. G. SMITH    3,472,485
VALVE SHANK SEAL
Filed Oct. 5, 1967
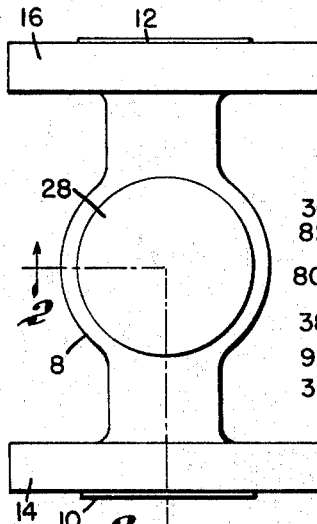
Fig. 1
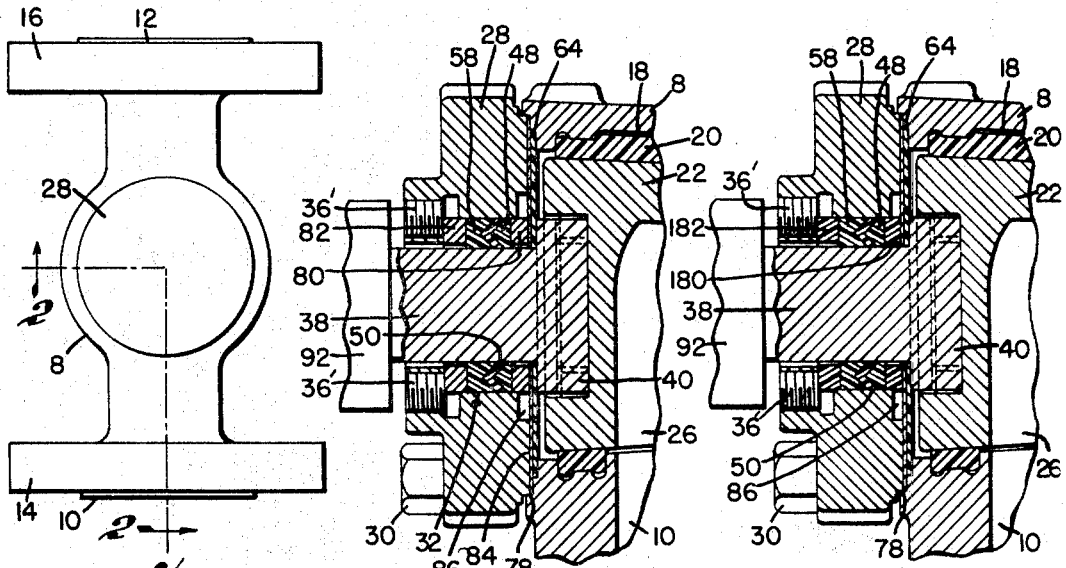
Fig. 3    Fig. 4
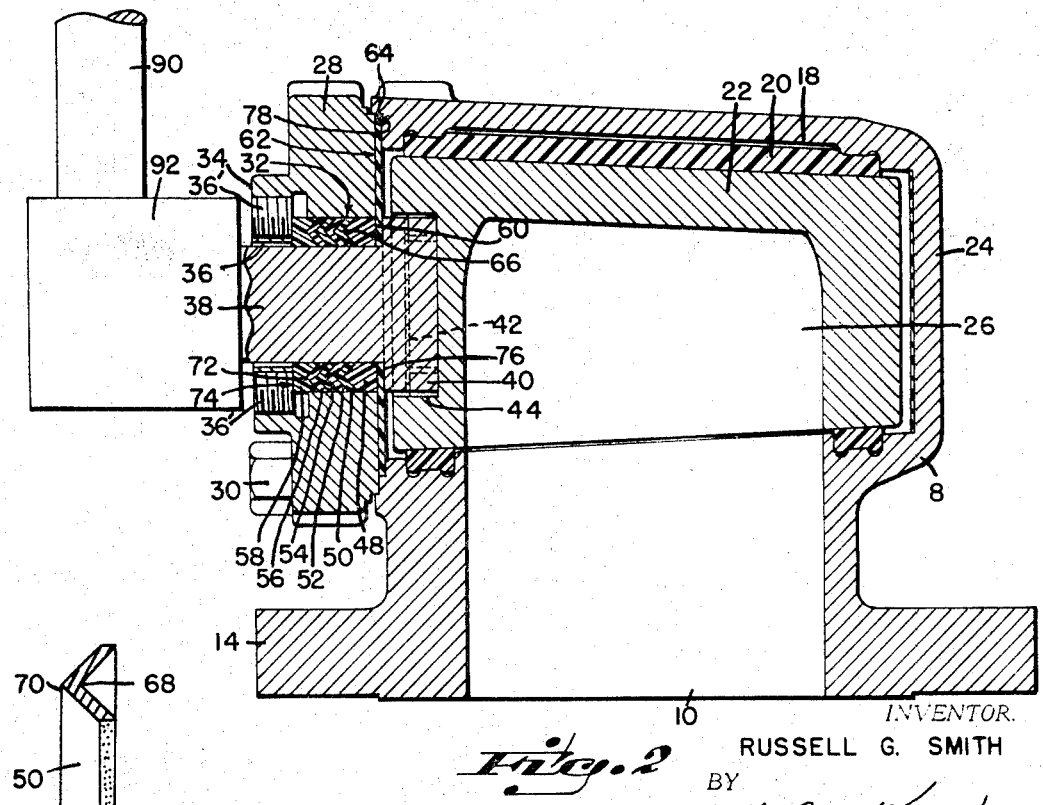
Fig. 2
Fig. 5
INVENTOR.
RUSSELL G. SMITH
BY
J. Warren Kinney Jr.
ATTORNEY United States Patent Office 3,472,485
Patented Oct. 14, 1969

3,472,485
VALVE SHANK SEAL
Russell G. Smith, Cincinnati, Ohio, assignor to Xomox Corporation, Cincinnati, Ohio, a corporation of Ohio
Filed Oct. 5, 1967, Ser. No. 673,153
Int. Cl. F16k 5/04, 31/44; F16l 7/00
U.S. Cl. 251—214                                15 Claims

ABSTRACT OF THE DISCLOSURE

Chevron-shaped pliable packing rings are contractable about the valve plug actuating shank, and expandable within a bore of the cover member which supports the shank, utilizing an adjustable compressive force that establishes an effective seal about the shank while at the same time compressing a sealing diaphragm closing the valve plug chamber and sealing it against fluid leakage. A flexible connection between the shank and the plug permits bodily shifting the plug automatically to close off the outlet port of the valve body in the event of destruction of a sleeve or liner in which the plug rotates. By a mere substitution of materials in the sealing elements, the valve is rendered fireproof without resort to structural alterations in the valve components.

---

This invention relates to an improved valve shank seal for use in plug-type valves.

A primary object of the invention is to provide means of a highly effective nature, for maintaining a fluid-tight seal about the actuating shank or stem of a valve of the rotary plug type.

Another object of the invention is to provide an improved sealing means for the shank of a valve plug, which means is simple and easy to install and maintain, and which will perform excellent service without attention for a long period of time.

Another object of the invention is to provide improved sealing means of the character stated, which imposes minimal resistance to rotation of the valve plug in opening and closing the valve.

A further object of the invention is to provide means in a lined plug valve construction, rendering the plug of the valve automatically self-adjusting within the seat bore of the valve to preclude leakage of fluid through the valve in the event that the lining material suffers accidental dissipation or vaporization by extreme heat, chemicals, or other damaging elements reaching the lining material of the valve.

The foregoing and other objects are attained by the means described herein and illustrated upon the accompanying drawing, in which:

FIG. 1 is a top plan view of a plug valve embodying the improvements of the present invention.

FIG. 2 is an enlarged cross-section taken on line 2—2 of FIG. 1.

FIG. 3 is a fragmentary cross-section showing a modification of the FIG. 2 structure.

FIG. 4 is a view similar to FIG. 3, showing a second modification.

FIG. 5 is a fragmentary enlarged cross-section of a chevron-type packing ring.

The valve as depicted by FIGS. 1 and 2, may comprise a body 8 having an inlet port 10 and an outlet port 12, each of which may be adapted for connection with pipe sections (not shown), for conveying a fluid under pressure into and from the valve. It is customary to make the pipe connections by means of screw threads, or possibly flanges such as 14 and 16, located at the ports 10 and 12. Body 8 is provided with a chamber in the form of a tapered bore 18 accommodating a stationary tapered liner or sleeve 20 within which the valve plug 22 may be rotated. The reduced end of bore 18 may be closed by an end wall 24 of the valve body.

The plug 22 has a through opening or passageway 26 therein, as is usual, to be placed in and out of registry with body ports 10 and 12 incident to partial rotation of the valve plug. Sleeve or liner 20 is of course apertured in registry with the body ports, and is fixed within bore 18 in any suitable manner. The inner surface of the sleeve is tapered complementarily to the taper of plug 22. The material of which the sleeve or liner is formed, may be Teflon or an equivalent impermeable substance presenting to the plug a resilient wear-resistant inherently slippery contact surface capable of making a fluid-tight seal with the tapered smooth outer surface of plug 22.

The larger end portion of tapered bore 18 may be closed by a metallic cover member 28 mounted upon the valve body by means of several cap screws 30. Cover 28 has a smooth bore 32 in coaxial relationship with the axis of rotation of plug 22, and at its outer end the cover is provided with a coaxial boss 34 drilled and tapped at several locations to accommodate adjusting screws 36' arranged parallel to and equidistant from the plug axis. Boss 34 has a bore 36 concentric with and smaller in diameter than the bore 32.

Bore 36 rotatably accommodates a shank or stem 38 which extends through the cover member and terminates in an enlarged head 40. The inner end of head 40 may be provided with an integral elongate key member 42 adapted to fit loosely within a socket or channel 44 formed in the larger end of plug 22, thereby to provide means for transmitting rotary motion of shank 38 to plug 22 notwithstanding a possible disalignment of the plug axis with respect to the axis of shank 38.

The disalignment above mentioned can result from dissipation or vaporization of sleeve or liner 20, due to excessive heating of the valve for example, as in the event of a fire. Should the sleeve or liner, be dissipated or vaporized for some reason while the valve is closed, plug 22 will be dislocated by pressure of fluid at entry port 10, to move bodily toward outlet port 12, thereby to close off the outlet port and prevent passage of fluid therethrough. The loose key and socket connection at 42-44 permits such dislocation of the plug to close off the outlet port, notwithstanding inability of shank 38 to shift laterally with the plug.

In the construction exemplified by FIG. 2, sealing of the shank 38 against leakage of fluid from the valve chamber is effected by means described as follows. It is noted that bore 32 in cover 28 is considerably larger in diameter than the diameter of the shank, so that a space is formed to receive the several packing rings 48, 50, 52, 54, 56 and 58, each of which surrounds the shank and fits within the bore 32 of cover 28. The innermost ring 48 has a back face 60 which may be substantially flat or planar as shown, to abut flatwise against one face 62 of a diaphragm 64. The opposite face of innermost ring 48 may be formed with an annular ridge or gable 66, to act as a wedge for expanding an adjacent packing ring 50, FIG. 5.

FIG. 5 is representative of each of the intermediate packing rings 50, 52, 54, and 56, and each has a valley 68 and an opposed ridge or wedge portion 70. The rings are characterized by limited pliability or resiliency.

Packing ring 50, and each of the rings intermediate the innermost ring 48 and the outermost ring 58, are chevron-shaped in transverse cross-section, and may therefore be said to be interfitting one within another. The annular valley 68 of ring 50 receives the annular ridge or wedge 66 of innermost ring 48. Likewise, the annular valleys of successive intermediate rings receive the annular ridge or wedges of the rings adjacent thereto.

One face of the outermost ring 58 has an annular valley 72 receptive of the ridge or wedge portion of ring 56, and the opposite face 76 of said ring 58 may be substantially flat or planar as shown, for abutting the inner ends of adjusting screws 36.

From the foregoing, it will be understood that by tightening the several adjusting screws 36, ring 58 will be advanced against all of the chevron rings to expand them against shank 38 and the wall of bore 32 within cover member 28. Also, the innermost ring 48 will thereby be pressed against diaphragm 64 and the adjacent shoulder 76 of head 40. Diaphragm 64 thereby is clamped at its central portion, between ring 48 and shoulder 76 to establish a fluid-tight seal.

The outer marginal portion of diaphragm 64 may be clamped by the force of cap screws 30, between cover member 28 and an annular shoulder or clamp face 78 on valve body 8, to establish there a fluid-tight seal.

Teflon or an equivalent resilient or pliable material may be utilized in the FIG. 2 construction, in forming all of the packing rings 48, 50, 52, 54, 56 and 58, and in forming the diaphragm 64 and sleeve 20. The chevron-shaped rings employed, that is, the intermediate rings 50, 52, 54 and 56, may be increased or decreased in number as desired.

In the modification, FIG. 3, the number of chevron rings has been reduced to one, though not necessarily so; and the innermost and outermost packing rings 48 and 58 are shown flanked by metallic compression rings 80 and 82, respectively. Moreover, the diaphragm 64 in this instance is provided with a cladding, or reinforcing disc 84 of metal which covers the entire outer face of the diaphragm. Disc 84 at its central portion may be clamped, with diaphragm 64, between the shank head 40 and the inner metallic compression ring 80, the peripheral margin of disc 84 and that of diaphragm 64 in FIG. 3, may be clamped by means of the screws 30, between the cover member 28 and the annular shoulder or clamp face 78 of the valve body.

In the FIG. 3 construction, the sleeve 20, the diaphragm 64, and the packing rings 48, 50 and 58, may be formed of Teflon or equivalent material, whereas the compression rings 80 and 82 may be of a rigid material such as metal. The metallic rings 80 and 82 have a loose fit about shank 38, and are slidable within the bore 32 of cover member 28.

Further with reference to FIG. 3, if the valve is required to withstand very high temperature conditions, or is to be used in circumstances which may subject the valve to flame, asbestos or an equivalent insulating material may be used in forming the diaphragm 64 and/or one or more of the packing rings 48, 50, 58. Various commercial heat-insulating compositions having a satisfactory degree of pliability for use in forming the diaphragms or packing rings, are readily available on the market.

The FIG. 4 modification differs from FIG. 3 only in that the compression rings 180 and 182 are of Teflon or the like, rather than of metal as used in the rings 80 and 82 of FIG. 3. The packing rings of FIG. 4, denoted 48, 50, 58, may be of Teflon or the like, or of asbestos or equivalent fire-proof material, depending upon conditions of service under which the valve may be used. The diaphragm 64 of FIG. 4 likewise may be suited to the service conditions by forming it of Teflon or equivalent material, or of asbestos, asbestos composition, or similar heat insulating material of a type meeting the sealing requirements aforesaid. Diaphragm 64 of FIG. 4 may be reinforced with a metallic cladding disc 78 mounted upon the valve body and relieved by the annular groove 86 substantially as explained in the description of FIG. 3. If desired, disc 78 may be bonded to one face of the diaphragm.

In all forms of the valve disclosed, the chevron-shaped packing rings are to be formed in accordance with the FIG. 5 disclosure, these being the rings 50, 52, 54 and 56, whether fabricated of Teflon, asbestos, or their equivalents. The flexible connection between the shank 38 and the large end of the valve plug, may characterize FIGS. 3 and 4 as well as FIG. 2.

From the foregoing explanation, it should be apparent that a valve embodying the improvements of the present invention, will be effectively sealed against fluid leakage about the cover member and along the actuating shank, with the use of simple yet durable means offering a minimum of resistance to opening and closing of the valve. In addition, the flexible or floating connection between the valve plug and the actuating shank permits bodily shifting of the plug automatically into closing relationship against the outlet port of the valve body, in the event of dissipation or vaporization of the sleeve or liner. The valve may be rendered practically fire-proof by mere substitution of materials in the sealing elements, without resort to major alterations in the structural parts of the valve.

In FIG. 2, the reference numeral 90 indicates an actuating lever having a socket head 92 for detachable application to the exposed outer end of shank or stem 38, whereby the shank or stem may be rotated for rotating the plug to open and closed valve positions.

It is to be understood that various modifications and changes may be made in the structural details of the valve, within the scope of the appended claims, without departing from the spirit of the invention.

Teflon has been suggested as a suitable sleeve material, however it should be understood that said term is meant to broadly include materials of the polyethylene group such as the halogenated ethylenes which are characterized by outstanding resistance to corrosives and solvents and extremely low coefficients of friction, such as polytetrafluoroethylene. The sleeve may likewise be fabricated from fluoronated hydrocarbon.

What is claimed is:

1. A plug-type valve comprising in combination: a body having a tapered chamber open at one end, and inlet and outlet ports in communication with said chamber; an annular clamp face on the body circumscribing the open end of the chamber; an apertured sealing diaphragm having a peripheral outer margin overlying said clamp face, said diaphragm spanning the open end of the chamber; an elongate tapered ported plug disposed within the chamber, with the larger end of the plug disposed adjacent to one face of the diaphragm; a tapered ported sealing sleeve receptive of the plug and fixed within the body chamber with the ports of the sleeve in registry with the inlet and outlet ports of the valve body; said plug being rotatable within the sleeve for selectively registering the plug port with the ports of the sleeve in the open condition of the valve; a cover member having an inner face overlying the sealing diaphragm and the aforesaid clamp face of the body, said cover member being bored to provide a packing chamber in substantial concentricity with the plug chamber of the body; means clamping the cover member onto the valve body, with the outer margin of the diaphragm clamped between the inner face of the cover member and the clamp face of the body aforesaid; an elongate actuating shank having an outer exposed end and an inner end, said shank extending axially through the packing chamber of the cover member with substantial clearance about the shank, said shank inner end being extended through the diaphragm aperture; a head at the inner end of the shank and including a shoulder in abutment with the diaphragm marginally of the diaphragm aperture; cooperative means on the shank head and the larger end of the plug, for transmitting rotation of the shank to the plug; a plurality of radially expandable packing rings surrounding the shank within the packing chamber of the cover member; and means for adjustably expanding the rings within the packing chamber and applying compressive force upon the diaphragm to seal the diaphragm against the shoulder of the shank head.

2. The valve as specified by claim 1, wherein the said cooperative means for transmitting rotation of the shank to the plug includes a flexible connection permitting dislocation of the plug laterally from the axis of the shank in the event of destruction of the sealing sleeve embracing the plug.

3. The valve as specified by claim 1, wherein the packing rings are substantially circular in form, and substantially chevron-shaped in transverse cross-section to establish upon opposite radial faces thereof an annular wedge and an annular valley, with the annular wedge of one ring fitted into the annular valley of a next adjacent ring, whereby axial compressive force applied to the rings drives the wedge of one ring into the valley of the adjacent ring, for radially expanding said adjacent ring within the packing chamber and against the actuating shank aforesaid to effect a fluid-tight seal.

4. The valve as specified by claim 3, wherein the chevron-shaped packing rings and the diaphragm and the plug sleeve are formed of a material of the class of Teflon.

5. The valve as specified by claim 4, wherein is included a pair of compression rings fitted within the packing chamber and about the shank, said compression rings flanking the group of packing rings within the packing chamber.

6. The valve as specified by claim 5, wherein is included a cladding member of hard fire-resistant material overlying at least one face of the diaphragm, and the inner face of the cover member is provided with an annular relief groove surrounding the packing chamber, said relief groove being larger in diameter than the diameter of the packing chamber.

7. The valve as specified by claim 5, wherein the said cooperative means for transmitting rotation of the shank to the plug includes a flexible connection permitting bodily dislocation of the plug laterally from the axis of the shank toward the outlet port of the valve body, in the event of dissipation of the sealing sleeve normally embracing the plug.

8. The valve as specified by claim 3, wherein the chevron-shaped packing rings and the diaphragm are formed of a fire-proof material of the class of asbestos, and the plug sleeve is formed of a material of the class of Teflon.

9. The valve as specified by claim 8, wherein the inner face of the cover member surrounding the packing chamber is provided with an annular relief groove larger in diameter than the diameter of the packing chamber.

10. The valve as specified by claim 9, wherein the cladding member is clamped against the diaphragm at the annular clamping face of the body, and at the shoulder of the shank head.

11. The valve as specified by claim 10, wherein the said cooperative means for transmitting rotation of the shank to the plug includes a flexible connection permitting dislocation of the plug laterally from the axis of the shank in the even of dissipation of the sealing sleeve embracing the plug.

12. The valve as specified by claim 3, wherein is included a pair of relatively hard inflexible compression rings loosely fitted within the packing chamber and about the shank, said compression rings flanking the group of packing rings within the packing chamber.

13. The valve as specified by claim 12, wherein the chevron-shaped packing rings and the diaphragm are formed of a fire-proof material of the class of asbestos, and the plug sleeve is formed of a material of the class of Teflon.

14. The valve as specified by claim 13, wherein is included a cladding member of hard fire-resistant material overlying at least one face of the diaphragm, and the inner face of the cover member surrounding the packing chamber is provided with an annular relief groove larger in diameter than the diameter of the packing chamber.

15. The valve as specified by claim 14, wherein the said cooperative means for transmitting rotation of the shank to the plug includes a flexible connection permitting dislocation of the plug laterally from the axis of the shank in the event of dissipation of the sealing sleeve embracing the plug.

References Cited

UNITED STATES PATENTS

| | | | |
|---|---|---|---|
| 2,981,284 | 4/1961 | Putnam | 251—214 X |
| 3,132,838 | 5/1964 | Smith | 251—317 X |
| 3,174,495 | 3/1965 | Anderson et al. | 251—317 X |
| 3,284,089 | 11/1966 | Wrenshall | 251—214 X |
| 3,334,650 | 8/1967 | Lowrey et al. | 137—375 |

WILLIAM F. O'DEA, Primary Examiner

D. R. MATTHEWS, Assistant Examiner

U.S. Cl. X.R.
137—375; 251—317